(12) United States Patent
Mackin et al.

(10) Patent No.: US 8,280,590 B2
(45) Date of Patent: Oct. 2, 2012

(54) AUTOMATICALLY ADJUSTABLE AXLE OSCILLATION STOPS

(75) Inventors: Ryan Patrick Mackin, Milan, IL (US); Daniel James Burke, Cordova, IL (US); Bruce Alan Coers, Hillsdale, IL (US)

(73) Assignee: Deere & Company, Moline, IL (US)

( * ) Notice: Subject to any disclaimer, the term of this patent is extended or adjusted under 35 U.S.C. 154(b) by 331 days.

(21) Appl. No.: 12/785,703

(22) Filed: May 24, 2010

(65) Prior Publication Data

US 2011/0288726 A1 Nov. 24, 2011

(51) Int. Cl.
*A01B 69/00* (2006.01)
*B62D 6/00* (2006.01)
(52) U.S. Cl. ......................................................... 701/41
(58) Field of Classification Search ............... 701/41, 701/69, 70, 75; 280/1.202, 5.51, 606, 211, 280/263, 426, 442, 124.126, 775, 93.506; 180/6.2, 204; 301/111.01, 112
See application file for complete search history.

(56) References Cited

U.S. PATENT DOCUMENTS 5,447,321 A * 9/1995 Hurlburt et al. .......... 280/93.504

FOREIGN PATENT DOCUMENTS

| DE | 2031910 | 1/1972 |
|---|---|---|
| DE | 10247699 | 4/2004 |
| EP | 1502769 | 2/2005 |
| EP | 2168786 | 3/2010 |
| JP | 62275812 | 11/1987 |
| JP | 63195002 | 8/1988 |

OTHER PUBLICATIONS

European Search Report Sep. 2, 2011, 7 pgs.

* cited by examiner

*Primary Examiner* — Mary Cheung

(57) ABSTRACT

An automatically adjustable axle stop of an agricultural combine (100) includes a sensor (222, 224) to sense the position of an extendible axle (200) supported on the chassis (214) of the agricultural combine (100) at a pivot coupling (206), the extendable axle (200) being configured to pivot about a longitudinal pivotal axis (208) with respect to the chassis (214), an electronic control unit (400) to read the sensor (222, 224), to calculate a stop position based at least on the sensor signal, and to control an axle oscillation stop (210, 212) in order to limit the range of pivoting of the extendible axle (200) about the pivotal axis (208).

7 Claims, 3 Drawing Sheets

AUTOMATICALLY ADJUSTABLE AXLE OSCILLATION STOPS

FIELD OF THE INVENTION

The invention relates generally to agricultural combines. It relates in particular to oscillation stops for the rear axles of agricultural combines. More particularly it relates to automatically adjustable axle oscillation stops for rear axles of agricultural combines.

BACKGROUND OF THE INVENTION

Agricultural combines are typically equipped with large front drive wheels that support the bulk of the weight of the agricultural combine as it travels through the field harvesting crops. They're also typically equipped with rear steerable wheels that are smaller in diameter than the front wheels and are configured to carry a smaller load.

One of the problems faced by agricultural combines is the need to maintain good contact with the ground as the terrain changes underneath the wheels, and also to minimize ground compaction as much as possible. If good contact is not maintained, wheels can spin and the agricultural combine can stall in the field. In addition, if the load shifts from wheel to wield added force on a wheel can call as the ground under that wheel to become unnecessarily compacted.

A traditional way to alleviate these problems has been to mount the rear steerable wheels on a pivoting axle. The axle is typically arranged to pivot about a pivotal axis of the agricultural combine that extends longitudinally and horizontally, parallel with the direction of forward travel as the agricultural combine is driven through the field. If the terrain over which the two large front drive wheels passes causes the agricultural combine to roll to the left, for example, the combine body will pivot about the longitudinal pivot axis of the rear axle. In this manner, the load is evenly distributed over the 4 wheels as much as possible and all four wheels maintain good contact with the ground.

The ability of the rear axle to pivot is not unlimited, however. Typically there are mechanical stops mounted to the axle, or to the frame above the axle at each end of the axle adjacent to the rear wheels of the agricultural combine. Without the stops, the combine could travel over rough terrain sufficient to cause the axle to pivot until one of the rear wheels rubs against the side of the combine and its mechanical components. This can cause the mechanical components to fail.

No one axle oscillation stop is suited for every situation, because wheels having tires of a variety of widths and heights can be used on a combine. If the dimensions of the wheel and tire change, the position of the axle oscillation stop should change as well. By adjusting the stop when the wheels and tires are changed, the maximum range of movement of the axle can be provided while still preventing the wheel and tire from damaging the side of the combine.

Furthermore, axles of agricultural combines are typically made so they can be extended or retracted. If an axle is extended (for example to permit a larger wheel and tire to be used) it is desirable to adjust the axle oscillation stops as well.

Unfortunately, there is no easy way to determine the best axle oscillation stop position when changing wheels, tires, and adjusting the length of the axle. As a further complication, future combines are now being proposed that we'll have not only a pivotable rear axle, but an automatically extendable and retractable rear axle. In these future combines, the rear axle of a combine can be extended and retracted, as necessary, to provide even where, or to provide steering clearance between the rear wheels and the sides of the combine automatically as the wheels are steered.

PURPOSE OF THE INVENTION

The purpose underlying this invention is seen in the need to provide an automatically adjustable axle oscillation stop that can automatically change the stop position in response to a determination of axle extension.

SUMMARY OF THE INVENTION

The problem is solved according to the invention at least by the teaching of patent claim 1, where the further patent claims cite characteristics that further develop the solution to great advantage.

In accordance with one aspect of the invention, and automatically adjustable oscillation stop for a steerable rear axle of an agricultural combine is provided, the combine having a longitudinal axis extending in a direction of travel, a chassis, two front drive wheels supported on the chassis, two rear steerable wheels disposed on a rear axle assembly that is supported on the chassis at a pivot coupling thereby permitting the rear axle assembly to pivot about a pivotal axis through a pivot angle, the rear axle assembly being extendible to permit at least a first of the two rear steerable wheels to have a first plurality of lateral positions, in which the automatically adjustable oscillation stop includes a first stop, interposed between the chassis of the agricultural combine and the rear axle assembly and configured to limit the pivot angle in a first direction of rotation about the pivotal axis, the first stop having a first plurality of different first stop positions, each of said first stop positions corresponding to a different pivot angle limit; a first sensor configured to generate a first signal indicative of the first plurality of lateral positions; and an electronic control unit coupled to the first stop to command the first stop to said first plurality of different first stop positions and coupled to the first sensor to receive the first signal therefrom, said electronic control unit having a non-volatile memory storing a first plurality of digital computer instructions, said first plurality further including instructions directing the electronic control unit to read the first signal, to digitally calculate a stop position for said first stop based at least upon the first signal that will prevent at least one component of the rear axle assembly from dragging against the agricultural combine when said rear axle assembly pivots with respect to the chassis of the agricultural combine.

The rear axle assembly may be extendible to permit at least a second of the two rear steerable wheels to have a second plurality of lateral positions. The oscillation stop may also include a second stop, the second stop being interposed between the chassis and the rear axle assembly, said second stop configured to limit the pivot angle in a second direction of rotation about the pivotal axis, said second stop having a first plurality of different second stop positions, each of said second stop positions corresponding to a different pivot angle limit; a second sensor configured to generate a second signal indicative of the second plurality of lateral positions; and the electronic control unit may be coupled to the second stop to command the second stop to said first plurality of second stop positions and may be coupled to the second sensor to receive the second signal therefrom. The electronic control unit may have a non-volatile memory configured to store a second plurality of digital computer instructions. The second plurality may include instructions directing the electronic control unit to read the second signal, to digitally calculate a stop position for said second stop based at least upon the second signal that will prevent at least another component of the rear axle assembly from dragging against the agricultural combine when said rear axle assembly pivots with respect to the chassis of the agricultural combine. The first stop may be fixed to the chassis of the agricultural combine and may abut the rear axle assembly at each of said first stop positions to stop further rear axle rotation in the first direction of rotation. The first stop may be fixed to the chassis of the agricultural combine and many the rear axle assembly on one side of the pivot coupling in each of said first stop positions to stop rear axle rotation in the first direction of rotation. The second stop may be fixed to the chassis of the agricultural combine and may abut the rear axle assembly on another side of the pivot coupling in each of the second stop positions to stop rear axle rotation in the second direction of rotation. The electronic control unit may be configured to automatically adjust the position of the first stop while the agricultural combine is moving over the ground. The electronic control unit maybe configured to automatically adjust the position of the first stop and the second stop when the agricultural combine is moving over the ground. The automatically adjustable oscillation stop may further include a second stop that is configured to limit the pivot angle in a second direction of rotation about the pivotal axis. The electronic control unit maybe coupled to the second stop to command the second stop to move to a plurality of second stop positions.

In accordance with a second aspect of the invention, an automatically adjustable oscillation stop of an agricultural combine includes a sensor to sense the position of an extendible axle, an electronic control unit to read the sensor and calculate a stop position based at least on the sensor signal, and an adjustable stop disposed to limit the range of pivoting of the extendible axle, the adjustable stop being controlled by the electronic control unit to move to the stop position.

DETAILED DESCRIPTION OF THE PREFERRED EMBODIMENTS

Figure 1:
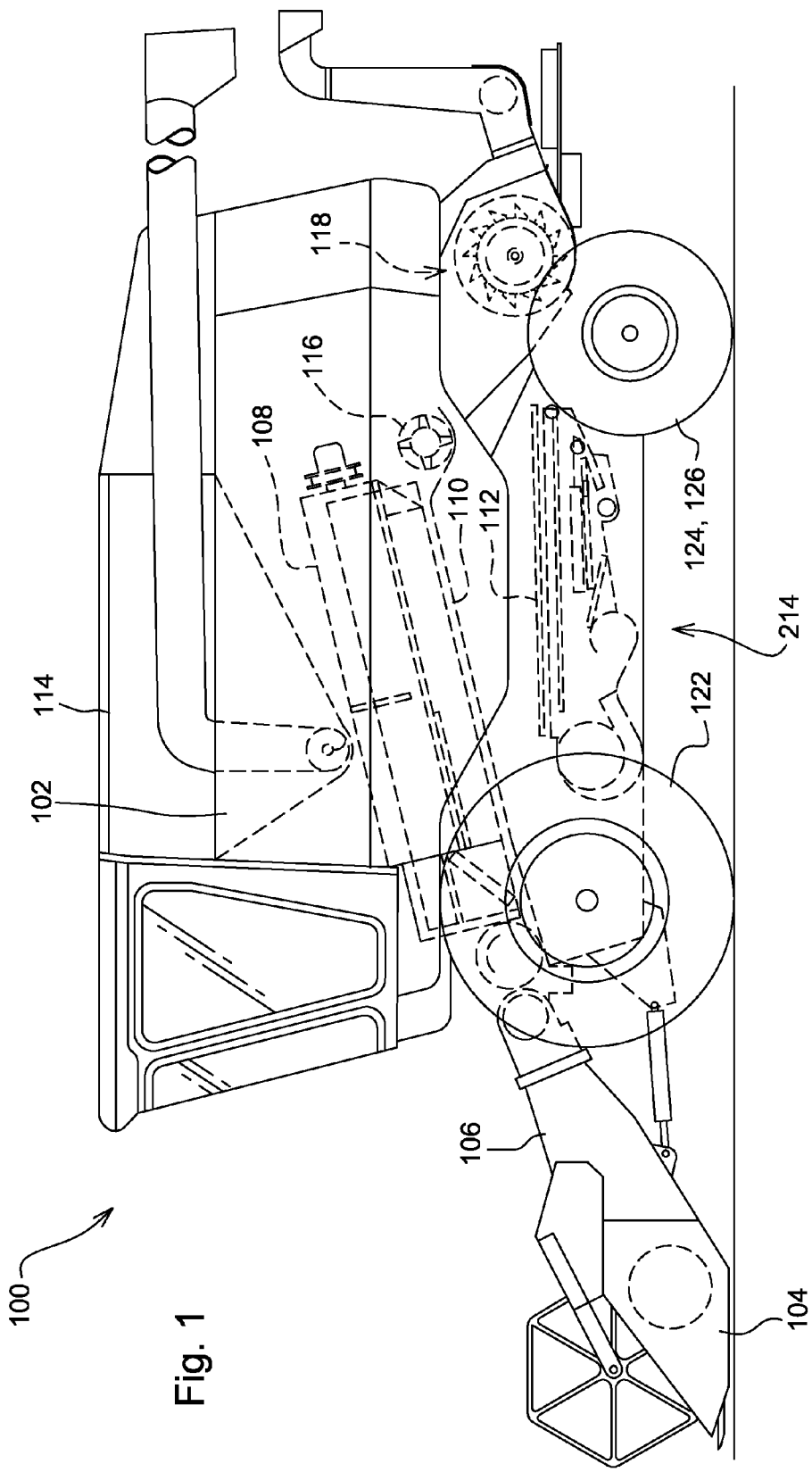
FIG. 1 illustrates a left side view of an agricultural combine in accordance with the present invention.

In FIG. 1, an agricultural combine 100 is shown that includes a self-propelled combine vehicle 102 and a harvesting head 104. Harvesting head 104 is supported on a feederhouse 106 with internal conveyor. Crop harvested by harvesting head 104 is carried up the internal conveyor to a threshing and separating system that includes a longitudinally extending rotor 108 that is disposed inside a concave 110. Grain that is separated in the threshing and separating process falls into a cleaning section 112. Clean grain from cleaning section 112 is carried upward by a conveyor (not shown) and is deposited in grain tank 114. The harvested material other than grain (MOG), which includes such material as corn cobs, shucks, plant stalks and leaves, is conveyed backwards into an accelerator 116. Accelerator 116 conveys the unwanted material into a chopper 118. Chopper 118 chops and distributes the material over the field.

Agricultural combine 100 is supported for travel over the field to harvest crops on two large front wheels 122 disposed on opposite sides of the front of the combine in mirror image positions. Agricultural combine 100 is also supported on two steerable rear wheels 124, 126. The wheels are supported on the chassis 103.

Figure 2:
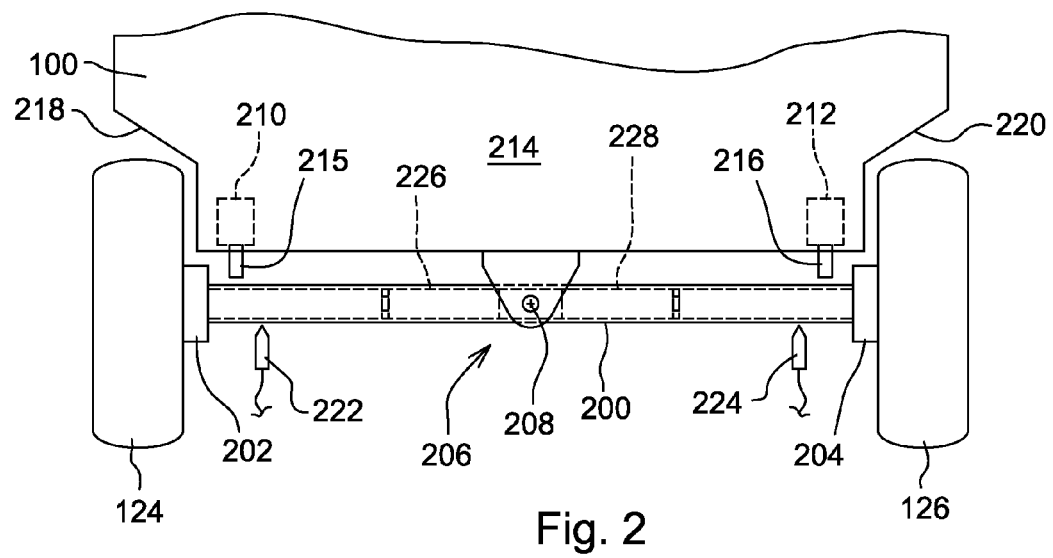
FIG. 2 is a schematic rear view of the combine of FIG. 1.

Referring now to FIG. 2, agricultural combine 100 can be seen supported on a rear axle assembly 201, including rear axle 200 and steerable rear wheels 124, 126 mounted on the axle, as well as hubs, steering knuckles, vendors, lights, cables, linkages, hoses, and all the other hardware mounted for pivoting together with axle 200. These additional items of rear axle assembly 201 have not been shown herein in order to more clearly show the construction and operation of the extendable axle.

Steerable rear wheels 124, 126 are mounted on hubs that in turn are affixed to steering knuckles 202, 204, respectively. This arrangement permits the rear wheels 124, 126 to be steered about a generally vertical axis with respect to the ends of the axle 200.

Axle 200 supports agricultural combine 100 at pivot coupling 206, which permits axle 200 to pivot with respect to the body of agricultural combine 100 about a pivotal axis 208 which extends longitudinally in the direction of travel of the combine and also horizontally. Axle oscillation stops 210, 212 are disposed adjacent to each end of the axle 200. Axle oscillation stops 210, 212 are fixed to the chassis 214 of agricultural combine 100. Axle oscillation stops 210, 212 have a lower end 215, 216 that is disposed to abut axle 200 when the axle pivots to prevent the axle from pivoting so far that wheels 124, 126 rub against the side walls 218, 220 of agricultural combine 100.

A means for sensing the axle and wheel position (here shown as two axle position sensors 222, 224) is disposed to sense the degree of extension of axle 200 and the turning (or steering) angle of wheels 124, 126.

Axle 200 is a telescopic axle and includes two internal hydraulic cylinders 226, 228 that are disposed to extend and retract an inner axle tube while the agricultural combine 100 is being driven through the field.

Other arrangements for extending and retracting an axle and steering the wheels mounted thereon can be found in co-pending U.S. patent application Ser. No. 12/463,628, filed 11 May 2009 by Deere & Company, the assignee of the present application. The application is incorporated herein by reference for all that it teaches, including (without limitation) the variety of means for sensing and positioning the axle and steering the wheels as well as the different axle configurations.

Figure 3:
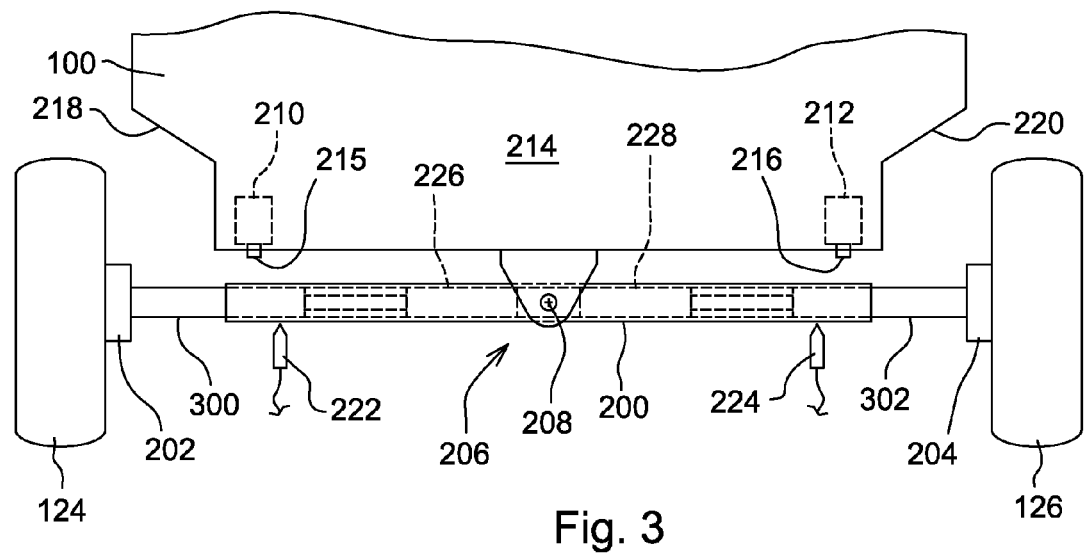
FIG. 3 is a schematic rear view of the combine of FIG. 2, but showing the rear axle of the agricultural combine as compared to the position shown in FIG. 2.

FIG. 3 illustrates the arrangement of FIG. 2 but with axle 200 in an extended position. Axle 200 is extended by extending hydraulic cylinders 226, 228. In FIG. 3, axle 200 has been extended at each end to expose left side telescopic portion 300 located on the left hand side of agricultural combine 100 and right side telescopic portion 302 located on the right hand side of agricultural combine 100. By extending axle 200, wheels 124, 126 have been moved a significant distance away from side walls 218 and 220 of agricultural combine 100, respectively. As a result, axle assembly 201 can pivot through a larger angle about pivotal axis 208 without rubbing against, impacting, or otherwise damaging portions of the combine such as the side walls 218, 220.

To permit axle 200 to pivot to this greater angle, axle oscillation stops 210, 212 have been automatically adjusted to move their lower ends 215, 216 farther away (e.g. upward) from axle 200. By moving the lower ends of the axle oscillation stops farther away, axle 200 can rotate both clockwise and counterclockwise through a greater angle, thereby permitting the combine to travel over rougher terrain and still equalize the load on the wheels while preventing the wheels 124, 126 from damaging the body of agricultural combine 100.

Figure 4:
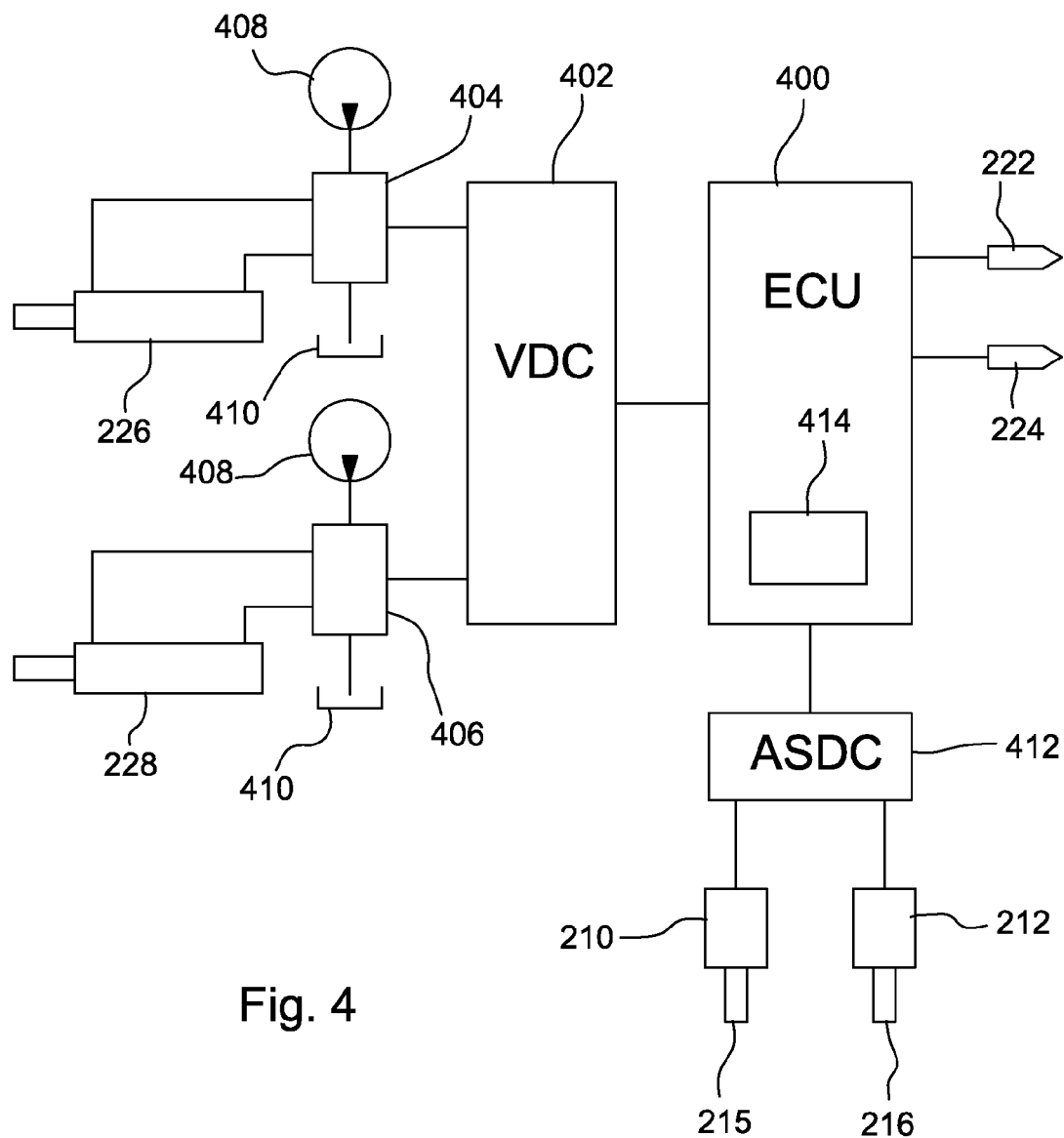
FIG. 4 is a schematic diagram of the axle oscillation stops and associated control circuitry.

FIG. 4 illustrates the hydraulic cylinders 226, 228 that extend and retract axle 200, the sensors 222, 224 that sense the axle position and the wheel position, and the axle oscillation stops 210, 212, as well as the control circuitry and valves that operate the hydraulic cylinders, monitor the sensors, and adjust the axle oscillation stops automatically.

An electronic control unit 400 is coupled to sensors 222, 224 and is configured to receive digital signals from the sensors indicating the amount of axle extension and the turning angle of wheels 124, 126. Electronic control unit 400 is also coupled to a valve driver circuit 402, which generates signals that control valves 404, 406. Valves 404, 406 are coupled to a source of hydraulic fluid under pressure 408 and a low-pressure hydraulic fluid reservoir 410. Valves 404, 406 are fluidly coupled to hydraulic cylinders 226, 228 to selectively and independently extend and retract hydraulic cylinders 226, 228 under the control of ECU 400.

Electronic control unit 400 is configured to receive signals from sensors 222, 224 and to selectively extend and retract hydraulic cylinders 226, 228 responsively.

Electronic control unit 400 is also configured to automatically adjust the position of axle oscillation stops 210, 212, as the electronic control unit 400 extends or retracts axle 200 to a position that ensures that axle 200 will not pivot so far that components of the rear axle assembly 201 will damage the body or chassis of agricultural combine 100.

It should be recognized that at each possible telescopic position of axle 200, there is a corresponding maximum upward pivot angle for the left wheel 124 and a corresponding maximum upward pivot angle for the right wheel 126. These two angles are not necessarily the same on the right side as on the left side since there may be different mechanical components extending from the sides of the vehicle. Therefore, although the combine is shown with symmetric sidewalls and symmetric clearance in FIGS. 2 and 3, this symmetry is not necessary to the invention.

For each permissible maximum angle of pivot of axle 200, there is a corresponding axle oscillation stop position for axle oscillation stops 210, 212. Electronic control unit 400 is further configured to automatically adjust the length of the axle oscillation stops 210, 212 as the vehicle is underway and as the length of axle 200 is changed to ensure that axle 200 cannot pivot to a position that will cause damage.

To automatically control the positions of axle oscillation stops 210, 212, electronic control unit 400 is coupled to an axle oscillation stop driver circuit 412.

The axle oscillation stop driver circuit 412 is configured to receive signals from electronic control unit 400 indicating the desired position of axle oscillation stops 210, 212, and to responsively generate signals that command the axle oscillation stops 210, 212 to extend or retract their lower ends 215, 216 to that desired position, thereby changing the maximum pivot angle of the rear axle assembly 201 in both the counterclockwise and the clockwise direction. Electronic control unit 400 is further configured to independently position in axle oscillation stops 210, 212 to accommodate differences between the left side pivot angle and the right side pivot angle.

Electronic control unit 400 includes a nonvolatile memory 414 in which it stores the digital instructions executed by a digital microprocessor, which forms the core of the electronic control unit 400. These digital instructions command the electronic control unit 400 to automatically adjust the position of axle oscillation stops 210, 212 based at least upon the degree of axle extension as indicated by sensors 222, 224.

Nonvolatile memory 414 also stores numeric values that indicate the relationship between the preferred position of axle oscillation stops 210, 212 for each of the extended positions of the left side telescopic portion 300 and right side telescopic portion 302 of axle 200. These values can be stored in a variety of formats well known to computer programmers.

For example, a lookup table can be stored in nonvolatile memory 414 that electronic control unit 400 accesses by (1) providing a value indicative of axle extension which it receives from sensors 222 or 224, and (2) by accessing the lookup table with that value, which responsively returns a value indicating the proper position of the corresponding axle oscillation stop 210, 212, respectively.

In another common arrangement, a series of programmed mathematical calculations can be stored in nonvolatile memory 414 that are executed to calculate the value indicating the proper position of the corresponding axle oscillation stop 210, 212.

By whatever method the lookups or calculations are performed, electronic control unit 400 is configured to take the value indicating the proper position of the corresponding axle oscillation stop and transmit that value or another value indicative thereof to the axle oscillation stop driver circuit 412. Axle oscillation stop driver circuit 412, in turn, generates the appropriate signal or signals to drive axle oscillation stops 210, 212 to their appropriate positions.

Electronic control unit 400 is configured to command valve driver circuits 404, 406 to extend or retract hydraulic cylinders 226, 228, and thus to extend or retract axle 200. Whenever electronic control unit 400 changes the length of axle 200, it is configured to substantially simultaneously determine the position of the axles, as described above, and automatically adjust the position of axle oscillation stops 210, 212.

The invention claimed is:

1. An automatically adjustable oscillation stop for a steerable rear axle of an agricultural combine (100), the combine (100) having a longitudinal axis extending in a direction of travel, a chassis (214), two front drive wheels (120, 122) supported on the chassis (214), two rear steerable wheels (124, 126) disposed on a rear axle assembly (201) that is supported on the chassis (214) at a pivot coupling (206) thereby permitting the rear axle assembly (201) to pivot about a pivotal axis (208) through a pivot angle, the rear axle assembly (201) being extendible to permit at least a first of the two rear steerable wheels (124, 126) to have a first plurality of lateral positions, the oscillation stop comprising:
a first stop (210, 212), said first stop (210, 212) being interposed between the chassis (214) of the agricultural combine (100) and the rear axle assembly (201), said first stop (210, 212) configured to limit the pivot angle in a first direction of rotation about the pivotal axis (208), said first stop (210, 212) having a first plurality of different first stop positions, each of said first stop positions corresponding to a different pivot angle limit;
a first sensor (222, 224) configured to generate a first signal indicative of the first plurality of lateral positions; and
an electronic control unit (400) coupled to the first stop (210, 212) to command said first stop (210, 212) to said first plurality of different first stop positions and coupled to the first sensor to receive the first signal therefrom, said electronic control unit (400) having a non-volatile memory (414) storing a first plurality of digital computer instructions, said first plurality further including instructions directing the electronic control unit (400) to read the first signal, to digitally calculate a stop position for said first stop (210, 212) based at least upon the first signal that will prevent at least one component of the rear axle assembly (201) from dragging against the agricultural combine when said rear axle assembly (201) pivots with respect to the chassis (214) of the agricultural combine (100).

2. The automatically adjustable oscillation stop of claim 1, wherein the rear axle assembly (201) is extendible to permit at least a second of the two rear steerable wheels (124, 126) to have a second plurality of lateral positions, the oscillation stop comprising:
   a second stop (210, 212), said second stop (210, 212) being interposed between the chassis (214) and the rear axle assembly (201), said second stop (210, 212) configured to limit the pivot angle in a second direction of rotation about the pivotal axis (208), said second stop (210, 212) having a first plurality of different second stop positions, each of said second stop positions corresponding to a different pivot angle limit;
   a second sensor (222, 224) configured to generate a second signal indicative of the second plurality of lateral positions; and
   wherein the electronic control unit (400) is coupled to the second stop (210, 212) to command said second stop (210, 212) to said first plurality of second stop positions and coupled to the second sensor (222, 224) to receive the second signal therefrom, said electronic control unit having a non-volatile memory (414) storing a second plurality of digital computer instructions, including instructions directing the electronic control unit (400) to read the second signal, to digitally calculate a stop position for said second stop (210, 212) based at least upon the second signal that will prevent at least another component of the rear axle assembly (201) from dragging against the agricultural combine when said rear axle assembly (201) pivots with respect to the chassis (214) of the agricultural combine (100).

3. The automatically adjustable oscillation stop of claim 2, wherein the first stop (210, 212) is fixed to the chassis (214) of the agricultural combine (100) and abuts the rear axle assembly (201) on one side of the pivot coupling (206) in each of said first stop positions to stop rear axle rotation in the first direction of rotation, and further wherein the second stop (210, 212) is fixed to the chassis (214) of the agricultural combine (100) and abuts the rear axle assembly (201) on another side of the pivot coupling (206) in each of said second stop positions to stop rear axle rotation in the second direction of rotation.

4. The automatically adjustable oscillation stop of claim 2, wherein the electronic control unit (400) is configured to automatically adjust the position of the first stop (210, 212) and the second stop (210, 212) when the agricultural combine (100) is moving over the ground.

5. The automatically adjustable oscillation stop of claim 1, wherein the first stop (210, 212) is fixed to the chassis (214) of the agricultural combine (100) and abuts the rear axle assembly (201) at each of said first stop positions to stop further rear axle rotation in the first direction of rotation.

6. The automatically adjustable oscillation stop of claim 1, wherein the electronic control unit (400) is configured to automatically adjust the position of the first stop (210, 212) while the agricultural combine (100) is moving over the ground.

7. The automatically adjustable oscillation stop of claim 1, further comprising a second stop (210, 212) that is configured to limit the pivot angle in a second direction of rotation about the pivotal axis (208), wherein the electronic control unit (400) is coupled to the second stop (210, 212) to command said second stop (210, 212) to move to a plurality of second stop positions.

* * * * *